July 18, 1944.　　　　J. L. RAY　　　　2,353,929
COMBUSTION TURBINE
Filed Jan. 29, 1940　　　2 Sheets-Sheet 1

July 18, 1944.   J. L. RAY   2,353,929
COMBUSTION TURBINE
Filed Jan. 29, 1940   2 Sheets-Sheet 2

Fig. 3

Inventor
J. L. Ray
by G. P. Ellis
Attorney

Patented July 18, 1944

2,353,929

UNITED STATES PATENT OFFICE 2,353,929

COMBUSTION TURBINE

James L. Ray, Elm Grove, Wis., assignor to Allis-Chalmers Manufacturing Company, Milwaukee, Wis., a corporation of Delaware Application January 29, 1940, Serial No. 316,073

24 Claims. (Cl. 60—41)

This invention relates generally to elastic fluid turbine systems and more particularly to those systems in which a high temperature working fluid is exhausted through a nozzle passage in order to reduce the temperature of the working fluid to a value which the blading material will withstand.

In accordance with this invention, the rate of flow and the pressure of the cooling fluid are regulated to maintain the pressure of cooling fluid equal to or nearly equal to the pressure of motive fluid throughout the normal operating range, to maintain the temperature of the inner wall of the jacketed combustion chamber and/or nozzle structure substantially constant under all operating conditions and preferably at the highest practical value with respect to temperature since this wall is not subjected to pressure stresses by the action of the motive fluid, and to maintain the temperature of the outer wall of said structure substantially constant and near the maximum value at which the outer wall will safely withstand the pressure stresses to which it is subjected. It is also in accordance with this invention to introduce the heated cooling fluid into a stage of the turbine in which the temperature and pressure of the motive fluid are commensurate with that of the cooling fluid. Maintaining the temperature of the inner and outer walls substantially constant as specified is accomplished by varying the rate of flow and/or the temperature of the cooling fluid passing through the jacket in accordance with the thermal energy of the motive fluid which reduces to a minimum the quantity of the cooling fluid required and the temperature difference between the motive and cooling fluids. Consequently, the fuel consumption necessary to maintain the motive fluid at a desired temperature and the heat dissipation are also materially reduced for all operating conditions. The introduction of the cooling fluid into a stage of the turbine in which the pressure and temperature of the motive fluid are commensurate with that of the cooling fluid insures an efficient recovery of the energy contained in the cooling fluid.

Turbine efficiency is improved with correlated increases in temperature and pressure and any attempt to increase the efficiency by using an excessive quantity of cooling fluid upsets the correlation between the temperature and pressure which is necessary for efficient operation and results in losses which in most cases more than offset the increase in turbine efficiency effected by the resultant increase in the pressure of the motive fluid. Consequently, it is also in accordance with this invention to employ a minimum quantity of cooling fluid at all times and to regulate the rate of flow and the pressure of the cooling fluid as previously stated in order to permit correlated increases in the temperature and pressure of the motive fluid and a corresponding increase in the overall efficiency.

It is therefore an object of this invention to provide an improved mode of operating high temperature elastic fluid turbine systems which will increase the efficiency of the turbine system.

Another object of this invention is to provide an improved mode of operating high temperature elastic fluid turbine systems which will decrease the quantity of cooling fluid required and the rate of heat dissipation.

Still another object of this invention is to provide an improved mode of operating high temperature elastic fluid turbine systems embodying a jacketed combustion chamber and/or nozzle structure which will permit the recovery of a greater portion of the energy contained in the cooling fluid.

Still another object of this invention is to provide an improved mode of operating high temperature elastic fluid turbines which will permit a material and correlated increase in the temperature and pressure of the motive fluid.

A further object of this invention is to provide a novel correlation of apparatus for effecting the improved modes of operation hereinabove set forth.

The invention accordingly consists of the various modes of operation and features of construction, combinations of elements and arrangement of parts as more particularly set forth in the appended claims and in the following detailed description in which:

Figure 1:
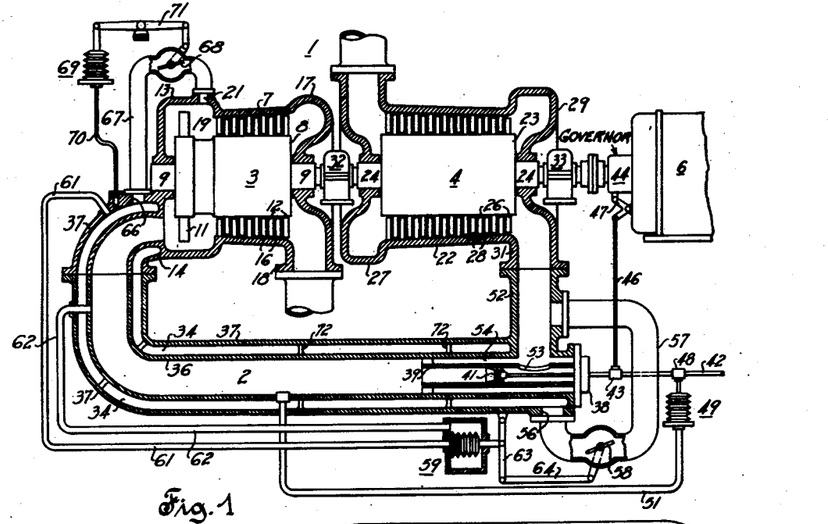
Fig. 1 is a schematic illustration of a gas turbine system embodying the invention.

Referring to the drawings, it is seen that the turbine system illustrated in Fig. 1 comprises an axially alined turbine compressor power unit I and a combustion chamber 2 and that the unit I includes a turbine 3 which is of the impulse reaction type, an axial compressor 4, and a generator 6.

The turbine 3 comprises a casing 7 and a spindle 8. The spindle is rotatably mounted in the casing 7 by means of the alined bearings 9 and is provided with axially spaced rows of impulse and reaction blading 11 and 12, respectively. The casing 7 is provided with an enlarged admission end portion 13 which includes a jacketed nozzle structure 14, spaced rows of stationary blades 16 which coact with the reaction blading 12 on the spindle 8, and an enlarged exhaust portion 17 which includes a discharge connection 18. The enlarged admission portion coacts with that portion of the spindle intermediate the impulse and reaction blading and forms therewith an annular chamber 19 which is provided with an inlet passage 21.

The compressor 4 comprises a casing 22 and a spindle 23. The spindle is rotatably mounted in the casing by means of alined bearings 24 and is provided with axially spaced rows of blades 26. The casing is provided with an enlarged inlet portion 27, axially spaced rows of stationary blades 28 which coact with the blades 26 on the spindle 23, and an enlarged exhaust portion 29 which includes a discharge connection 31. The adjacent ends of the turbine and blower spindles are connected for simultaneous rotation by means of a suitable coupling member 32. The adjacent ends of the blower and generator spindles are also operatively connected together in any suitable manner such as by means of the coupling 33, and in this connection, it should be understood that in accordance with the usual practice electrical connections (not shown) would be employed for transmitting the electrical energy developed by the generator to a power line and for operating the said generator as a starting motor.

The combustion chamber 2, which is jacketed to provide a cooling space 34, comprises generally cylindrical spaced inner and outer shells 36 and 37, respectively, defining therebetween the said cooling space, the outlet end of which communicates with and forms a continuation of the cooling space provided by the jacketed nozzle structure 14. The opposite end of the combustion chamber is provided with a burner structure 38 including a mixing tube 39 disposed in spaced coaxial relation within the inner shell 36, a nozzle structure 41 coaxially disposed within the mixing tube 39, a fuel supply pipe 42, and a regulating valve 43 which is operatively connected with a load or speed responsive governing device 44 by means of the stem 46 and the bell crank lever 47. The governing device 44, which is hereafter referred to as a speed responsive governor, varies the position of the valve 43 and thereby the fuel supply or the firing rate in accordance with changes in speed as effected by changes in load. The fuel supply pipe 42 is provided with a control valve 48, which is arranged in series flow relation with respect to the regulating valve 43. The control valve is normally in its fully open position and is either closed or moved towards its closed position by means of the temperature limiting device 49 which may be of any desired form and which is operatively associated with the interior of the combustion chamber 2 and the inner shell 36 thereof by means of the connection 51. The regulating and temperature limiting means just described and their operation are well known in the art and a more detailed description of these features is deemed unnecessary for a complete understanding of the invention.

The combustion chamber is also provided with an air inlet connection 52 which is connected with the discharge connection 31 of the compressor 4 and with the interior of the inner shell 36 at a point adjacent the burner end of the combustion chamber to supply the necessary primary and secondary air for combustion purposes. The primary air enters the mixing tube 39 through an opening 53 in the side wall thereof at a point between the nozzle 41 and the adjacent end of the combustion chamber, and the secondary air flows into the combustion chamber through the annular space 54 provided between the inner shell 36 and the mixing tube 39. The burner end of the outer shell 37 is provided with an inlet passage 56 which is connected with the combustion chamber air inlet connection 52 by means of the pipe 57. The pipe 57 includes a regulating valve 58, the position of which is varied in accordance with the pressure difference between the cooling and motive fluids by means of the pressure responsive device 59 which is connected with the interior of the cooling space 34 and with the combustion chamber 2 by means of the pipes 61 and 62, respectively, and which is operatively connected with the valve 58 by means of the levers 63 and the link 64. The arrangement is such that when the pressure of the motive fluid decreases, the valve is moved toward its fully closed position to effect a corresponding decrease in the pressure of the cooling fluid, and that when the pressure of the motive fluid increases, the valve is moved toward its fully open position to effect a corresponding increase in the pressure of the cooling fluid.

The jacketed nozzle structure 14 is provided with a cooling fluid outlet passage 66 which is connected with the inlet passage 21 provided in the enlarged admission end of the turbine 3 by means of the pipe 67. The pipe includes a regulating valve 68, the position of which is varied in accordance with the temperature of the outer wall of the jacketed nozzle structure by means of the temperature responsive device 69 which is connected to be responsive to the temperature of the outer wall or shell 37 by means of the connection 70, and which is operatively connected with the valve by means of the lever 71. The arrangement is such that when the temperature of the outer wall increases, the valve 68 is moved toward its fully open position, and that when the temperature decreases, the valve is moved toward its fully closed position. The cooling space 34 may be provided with baffles 72 which may be of any suitable form and arranged as desired to effect a more uniform distribution of the cooling fluid.

As previously indicated, the speed responsive governor 44 operates to vary the rate of fuel delivery or the firing rate in accordance with changes in load, and it should therefore be obvious that the power unit 1 normally operates at a substantially constant predetermined speed. The variation in the firing rate effects a variation in the temperature of the motive fluid of as much as several hundred degrees F., but the pressure of the motive fluid adjacent the burner end of the combustion chamber, and, consequently, the discharge pressure of the compressor 4 seldom varies more than a few pounds. For example, actual test data covering the normal operating range of a unit similar to that illustrated in Fig. 1 shows that the temperature of the motive fluid before leaving the nozzle 14 varies from 1140 to 1380 degrees F., that the compressor discharge pressure varies from 37 to 42 pounds per square inch, and that the temperature and the pressure of the motive fluid in the annular chamber 19 varies from 770 to 950 degrees F., and from 35 to 37 pounds per square inch, respectively. Consequently, it is seen that the quantity of air delivered by the compressor during normal operation is nearly constant, and that, since the temperature of the motive fluid is indicative of its energy content, the energy content of the motive fluid varies in accordance with the firing rate.

The compressor 4 delivers all of the air required for combustion and cooling purposes, and since the combustion chamber and the cooling space discharge into a common chamber, the annular chamber 19, the combustion chamber and cooling space are arranged in parallel flow relation. The flow resistance of the passage including the combustion chamber 2 is for all practical purposes substantially constant, and if it is assumed that the regulating valves 58 and 68 are always held in their fully open position, the flow resistance of the passage including the cooling space 34 is also substantially constant. Consequently, since the quantity of air discharged from the compressor during normal operation is nearly constant, that portion of the air which by-passes the combustion chamber during normal operation, i. e., flows through the passage including the cooling space 34, will also be nearly constant provided the valves 58 and 68 are either omitted or held in a predetermined open position. Therefore, in order to maintain the pressure of the cooling fluid equal to or nearly equal to the pressure of the motive fluid throughout the normal operating range, and to maintain the temperature of the outer wall 37 of the combustion chamber and nozzle structure substantially constant and near the maximum value at which the outer wall will safely withstand the pressure stresses to which it is subjected, the passage including the cooling space 34 must be so dimensioned and the valves 58 and 68 and their operators 59 and 69, respectively, must be so correlated with respect to one another and with respect to the pressures and temperature, respectively, that as the power developed by the unit I is either increased or decreased, which results from a variation of the firing rate, the rate of flow and the pressure of the cooling fluid are varied accordingly.

This result is preferably accomplished by dimensioning the passage including the cooling space 34 so as to permit the passage of a quantity of cooling fluid which is only slightly in excess of that required to effect the necessary cooling action when the unit I is developing maximum power and the valves 58 and 68 are in their fully open position, and by the previously described arrangement and operation of the said valves. An increase or a decrease in the firing rate effects an increase or a decrease in both the temperature and the pressure of the motive fluid which in turn effects a corresponding increase or decrease in the temperature of the cooling fluid and of the outer wall or shell 37. Consequently, with the valves 58 and 68 arranged and operated as previously described, it being understood, of course, that for minimum load conditions both of said valves are nearly closed and that for maximum load conditions both of said valves are fully open or nearly full open depending upon the excess flow permitted by the dimensions of said passage, an increase in the firing rate causes the temperature responsive device 69 to move the valve 68 toward its fully open position, thereby increasing the rate of flow of the cooling fluid and the pressure responsive device 59 to move the valve 58 toward its fully open position, thereby effecting an increase in the pressure of the cooling fluid and a corresponding and further increase in the rate of flow. Both of the valves 58 and 68 are moved an amount proportional to the change in pressure and temperature, respectively, and it should be obvious that if the firing rate is decreased, the operation will be the opposite of that just described.

The operation of the valve 58 to increase and decrease the pressure of the cooling fluid as the pressure difference between the cooling and motive fluids increases and decreases maintains the pressure differential between the combustion chamber 2 and cooling space 34 substantially constant at a predetermined value since a variation of the firing rate from no load to full load effects only a slight increase in the pressure of the motive fluid as is evidenced by the operating data previously cited. The heated cooling fluid discharged from the cooling space 34 passes through the pipe 67 and into the annular chamber 19, and into the first reaction stage of the turbine as shown in the drawings. The heated cooling fluid can be most efficiently utilized by introducing the said fluid into that intermediate or low pressure stage of the turbine in which the pressure and temperature of the motive fluid are commensurate with that of the cooling fluid passing through the discharge pipe from the cooling space, and whether the proper intermediate stage is that shown in the drawings or some other low pressure stage can be readily determined by any one skilled in the art from a consideration of the turbine design and the initial temperature and pressure of the cooling fluid employed.

Figure 2:
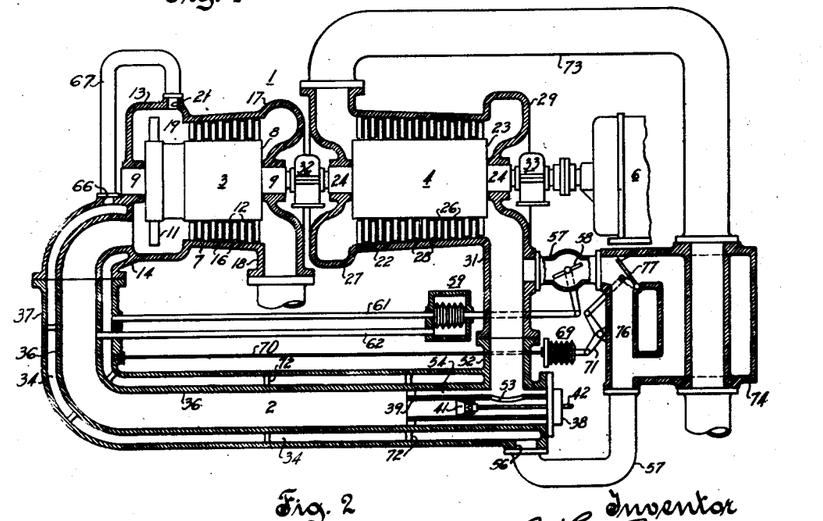
Fig. 2 schematically illustrates a modified construction.

Referring to Fig. 2 which shows a modified arrangement in which like numerals are used to designate the same or similar parts, it is seen that the power unit I and the combustion chamber 2, including the burner structure 38, are identical in construction and arrangement to those illustrated in Fig. 1, and that the valves 43 and 48 controlling the firing rate and the speed responsive and temperature limiting devices 44 and 49, respectively, for operating the said control valves have been omitted in the interests of simplicity. However, it should be understood that in actual practice, the control valves and their operators would be provided for varying the firing rate in the manner set forth in connection with Fig. 1.

This modification differs from that shown in Fig. 1 in that the inlet portion of the compressor 4 communicates with the atmosphere through a conduit means 73 including a heat exchanger 74, that the pipe 57 is connected with the heat exchanger 74 which includes a bypass passage 75 and a regulating valve 77 arranged to vary the quantity of cooling fluid passing through said heat exchanger proper and said bypass passage, that the pressure actuated valve 58 is positioned in the pipe 57 on the upstream side of the said heat exchanger, that the temperature regulating device 69 is operatively connected with the regulating valve 77, and that the regulating valve 68 is omitted from the pipe 67.

The air is discharged from the compressor 4 at a predetermined temperature, usually in the neighborhood of 350–375 degrees F., and with this arrangement the temperature of the air entering the cooling space, which is only a small part of the total air discharged from the compressor, may be decreased sufficiently, depending upon the efficiency of the heat exchanger and the position of the valve 77, to closely approach the ambient temperature. The arrangement of the valves 58 and 77 is preferably such that when the unit 1 is developing minimum power or idling, the said valves are in the approximate positions shown and that when the unit is developing maximum power, the valve 58 is in its fully open or nearly fully open position and the valve 77 is positioned to direct all of the cooling air through the heat exchanger proper. The passage including the cooling space 34 and the heat exchanger 74 is preferably dimensioned to permit the flow of a quantity of cooling fluid which is only slightly in excess of that actually required for cooling purposes when the unit 1 is developing maximum power and the valves 58 and 77 are positioned to conform with the development of maximum power as previously stated.

The valves 58 and 77 are correlated with their respective operators so as to be moved an amount proportional to the change in temperature and pressure of the cooling fluid. Consequently, with the valves positioned as shown, it is seen that an increase in the temperature of the outer wall 37, which is effected by an increase in the firing rate and the resultant increase in the temperature and pressure of the motive fluid, causes the temperature responsive device 69 to move the valve 77 to permit some of the cooling fluid to pass through the heat exchanger proper to thereby reduce the temperature of the fluid entering the cooling space 34 and causes the pressure responsive device 59 to move the valve 58 toward its fully open position, thereby increasing both the pressure and the rate of flow of the cooling fluid. The operation of the valves in response to a decrease in load as is evidenced by a decrease in the firing rate and in the temperature and pressure of the motive fluid will be the opposite of that just described. If for any reason there is either an increase or a decrease in the pressure of the cooling fluid, the arrangement in both systems is such that the pressure responsive device 59 will move the valve 58 to maintain the pressure difference between the cooling and motive fluids at the predetermined value.

Figure 3:
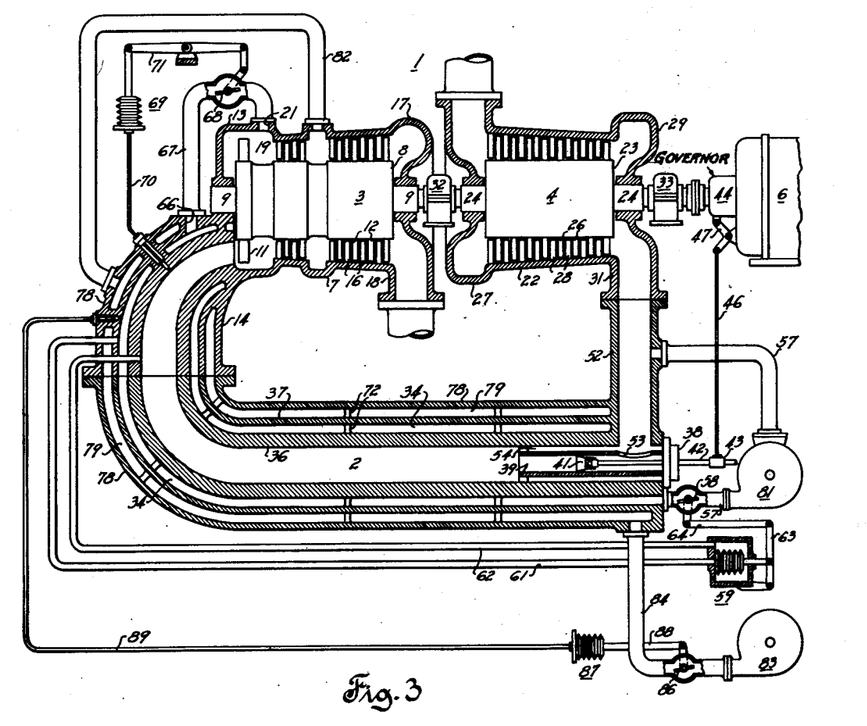
Fig. 3 schematically illustrates a further modification.

Referring to Fig. 3 in which like numerals are used to designate the same or similar parts, it is seen that this modification differs from that shown in Fig. 1 in that the inner shell 36 of the jacketed combustion chamber 2 and nozzle structure 14 is made relatively thick and/or of a material having a low rate of heat conductivity, in that the entire combustion chamber and nozzle structure is enclosed in a shell 78 which is spaced from the shell 37 to provide an additional cooling space 79 surrounding the shell 37, in that a booster compressor 81 is connected in the pipe 57 to increase the pressure of the cooling fluid delivered to the cooling space 34, in that the nozzle end of the cooling space 79 is connected by means of the pipe 82 with a lower pressure stage of the turbine than is the cooling space 34, in that the burner end of the cooling space 79 is connected with a separate cooling fluid compressor 83 by means of the pipe 84 which includes a regulating valve 86, in that the temperature responsive device 69 is made responsive to the temperature of the inner wall 36 so as to function as a temperature limiting device which operates to move the valve 68 from its normal partially closed position and toward its fully open position only in the event the temperature of the inner wall is near the permissible maximum limit, and in that an additional temperature responsive device 87 is operatively associated with the valve 86 by means of the stem 88 and with the shell 37 by means of the connection 89.

In accordance with this modification, the passage including the cooling space 34 is so dimensioned and the discharge pressure of the cooling fluid booster compressor 81 is such that when the valves 58 and 68 are both in the approximate partially closed positions shown and the unit is either developing minimum power or idling the pressure of the cooling fluid within the space 34 is equal to or nearly equal to the pressure of the motive fluid and the rate of flow of the cooling fluid through said space is sufficient to maintain the temperature of the innermost shell at substantially the highest practical value and that as the temperature and the pressure of the motive fluid increases, the pressure responsive device 59 moves the valve 58 toward its fully open position an amount sufficient to effect a corresponding increase in the pressure of the cooling fluid within the space 34. An opening movement of the valve 58 also effects a proportionate increase in the rate of flow of the cooling fluid through the said space which is usually sufficient to maintain the temperature of the innermost shell substantially constant throughout the normal operating range. When the unit is developing maximum power, the valve 58 will be in its fully open or nearly fully open position and the valve 68 will normally remain in the partially closed position shown. However, if for any reason the temperature of the innermost shell tends to exceed the value at which the temperature responsive device 69 is set to operate, the valve 68 will be moved toward its fully open position an amount sufficient to maintain the temperature at the desired predetermined value. Consequently, when the unit is developing maximum power, it is preferable to have the valve 58 in its nearly fully open position so that the valve may be opened wider in order to compensate for the drop in pressure which would be produced by an opening movement of the valve 68.

The passage including the cooling space 79 is so dimensioned, taking into consideration the pressure of the cooling fluid discharged from the compressor 83 and the maximum temperature at which the intermediate shell 37 will safely withstand the pressures to which it will be subjected, that when the unit is idling or developing minimum power, the valve 86 is nearly closed and that when the unit is developing maximum power, the valve 86 is in its nearly fully open position. With this arrangement sufficient cooling fluid will flow through the space 79 to maintain the temperature of the intermediate shell 37 substantially constant and near the said predetermined maximum value. Any variation in the temperature of the intermediate shell 37 causes the temperature responsive device 87 to move the valve 86 so as to vary the rate of flow of the cooling fluid and maintain the temperature of this shell substantially constant throughout the normal operating range.

The primary function of the temperature responsive device 87 and the valve 86 is to control the rate of flow of the cooling fluid through the space 79 so as to maintain the temperature of the intermediate shell 37 substantially constant and near the maximum value at which the wall will safely withstand the pressure stresses to which it is subjected with a minimum quantity of cooling fluid, whereas the primary function of the temperature responsive device 69 and the valve 68 is that of a temperature limiting device which rarely functions since the rate of flow and the pressure of the cooling fluid within the space 34 are normally controlled by the pressure responsive device 59 and the valve 58. Generally speaking, the rate of flow of the fluid in the space 34 is much less than that in the space 79 since in the first case, the primary function of the fluid is to equalize the pressure exerted on the innermost shell by the motive fluid, whereas the primary function of the fluid in the space 79 is to cool the shell 37. Obviously, if the temperature of the intermediate shell is maintained substantially constant and at a safe value as previously stated, the temperature of the outermost shell 78 will also be at a safe value and considerably less than that of the shell 37.

The rate of flow of heat through a substance is dependent upon its heat conductivity and upon its thickness, and consequently, if the shell 36 is made relatively thick and of a material having a low heat conductivity as indicated in Fig. 3, the rate of heat flow from the combustion chamber into the space 34 can be materially reduced which in turn permits a material reduction in the quantity of cooling fluid flowing which must be passed through the space 79 of Fig. 3 or the space 34 of Figs. 1 and 2. Moreover, if the temperature of the motive fluid exceeds the permissible maximum temperature for the innermost shell 36 in the arrangement shown in Fig. 3, the quantity of cooling fluid which must be passed through the space 34 can also be reduced. The heated cooling fluid leaving the space 79 is also delivered to a low pressure stage of the turbine in which the pressure and temperature of the motive fluid is nearly commensurate with that of the cooling fluid. The modification illustrated by Fig. 3 will permit the use of a motive fluid having materially higher temperatures and pressures than is permissible with the previously described arrangements shown in Figs. 1 and 2, while at the same time affording all of the advantages provided by the said two arrangements.

The invention contemplates a correlation of features and a mode of operation which is such that the pressure of the cooling fluid which contacts the shell or wall separating the motive and cooling fluids is equal to or nearly equal to the pressure of the motive fluid throughout the normal operating range in order to effectively relieve the said shell or wall of pressure stresses to which it would otherwise be subjected, that the temperature of the motive fluid confining shell or wall is maintained substantially constant at the highest practical value with respect to temperature throughout the operating range of the unit, that the quantity of cooling fluid required and the temperature difference between the motive and cooling fluids is a minimum, that the energy contained in the heated cooling fluid is recovered in a low pressure stage of the turbine in which the temperature and pressure of the motive fluid are commensurate with that of the heated cooling fluid, and that the temperature of a shell or wall which is spaced from the motive fluid confining shell or wall is maintained substantially constant and near the maximum value at which the said spaced shell or wall will safely withstand the pressure stresses to which it is subjected. The invention is applicable to all types of high temperature turbines embodying a cooled combustion chamber and/or nozzle structure, and although for purposes of illustration the invention has been disclosed in connection with a gas turbine system, it should be understood that the source and the type of cooling fluid employed are purely a matter of selection, that the type of heat exchanger and the medium employed therein to effect the necessary cooling action is also a matter of selection, and that it is not desired to limit the invention to the exact mode of operation and to the exact details of construction herein shown and described as various modifications within the scope of the appended claims may occur to persons skilled in the art.

It is claimed and desired to secure by Letters Patent:

1. The method of operating elastic fluid turbines having means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the said one wall and with respect to the wall which is immediately adjacent the said one wall, increasing and decreasing the temperature and the pressure of the motive fluid as the load increases and decreases throughout the normal operating range, and increasing and decreasing the rate of flow and the pressure of the cooling fluid so as to maintain the temperature of the said adjacent wall substantially constant and near the maximum value at which the said adjacent wall will safely withstand the pressure stresses to which it is subjected and so as to maintain a minimum and substantially constant pressure differential between the cooling and motive fluids.

2. The method of operating elastic fluid turbines having a means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the wall which is immediately adjacent the said one wall, increasing and decreasing the temperature of the motive fluid as the load increases and decreases throughout the normal operating range, and decreasing and increasing the initial temperature of the cooling fluid so as to maintain the temperature of said adjacent wall substantially constant and near the maximum value at which the said adjacent wall will safely withstand the pressure stresses to which it is subjected.

3. The method of operating elastic fluid turbines having a means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the said one wall and with respect to the wall which is immediately adjacent the said one wall, increasing and decreasing the temperature of the motive fluid as the load increases and decreases throughout the normal operating range, and decreasing and increasing the initial temperature, the rate of flow and the pressure of the cooling fluid so as to maintain the temperature of said adjacent wall substantially constant and near the maximum value at which the said adjacent wall will safely withstand the pressure stresses to which it is subjected and so as to maintain a minimum and substantially constant pressure differential between the cooling and motive fluids.

4. The method of operating elastic fluid turbines having means including spaced walls defining a jacketed nozzle arranged to deliver a motive fluid to a row of moving blades which comprises flowing a high temperature motive fluid through said nozzle and in contact with one of said walls, simultaneously flowing some cooling fluid through the space between the said one wall and the next adjacent wall and additional cooling fluid in heat exchanging relation with respect to the outer surface of the said next adjacent wall, increasing and decreasing the temperature and the pressure of the motive fluid as the load increases and decreases throughout the normal operating range, increasing and decreasing the pressure of the said some cooling fluid flowing through said space so as to maintain a minimum and substantially constant pressure differential between the said some cooling fluid in the said space and the motive fluid, and increasing and decreasing the rate of flow of the additional cooling fluid flowing in heat exchanging relation with respect to the said next adjacent wall so as to maintain the temperature of said next adjacent wall substantially constant and near the maximum value at which the said next adjacent wall will safely withstand the pressure stresses to which it is subjected.

5. The method of operating elastic fluid turbines having a plurality of pressure stages and means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the wall which is immediately adjacent the said one wall, increasing and decreasing the temperature of the motive fluid as the load increases and decreases throughout the normal operating range, increasing and decreasing the rate of flow of the cooling fluid so as to maintain the temperature of said adjacent wall substantially constant and near the maximum value at which the said adjacent wall will safely withstand the pressure stresses to which it is subjected, and delivering the cooling fluid which has passed in heat exchanging relation with respect to the said adjacent wall to a low pressure stage of the turbine in which the temperature and pressure of the motive fluid are commensurate with that of the heated cooling fluid.

6. The method of operating elastic fluid turbines having a plurality of pressure stages arranged in series flow relation and a means including spaced walls defining a jacketed nozzle arranged to deliver the motive fluid to the first of said stages which comprises simultaneously flowing a high temperature motive fluid through the nozzle and in contact with one of said walls and a cooling fluid in heat exchanging relation with respect to the wall which is immediately adjacent the said one wall, increasing and decreasing the temperature of the motive fluid as the load increases and decreases throughout the normal operating range, varying the rate of flow and the pressure of the cooling fluid so as to maintain the temperature of said adjacent wall substantially constant and near the maximum value at which the said adjacent wall will safely withstand the pressure stresses to which it is subjected and so as to maintain a minimum and substantially constant pressure differential between the cooling and motive fluids, and delivering the cooling fluid which has passed in heat exchanging relation with respect to said adjacent wall to a low pressure stage of the turbine in which the temperature and pressure of the motive fluid are commensurate with that of the heated cooling fluid.

7. The method of operating elastic fluid turbines having a plurality of pressure stages and a means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the wall which is immediately adjacent the said one wall, increasing and decreasing the temperature of the motive fluid as the load increases and decreases throughout the normal operating range, decreasing and increasing the initial temperature of the cooling fluid so as to maintain the temperature of said adjacent wall substantially constant and near the maximum value at which the said adjacent wall will safely withstand the pressure stresses to which it is subjected, and delivering the cooling fluid which has passed in heat exchanging relation with respect to the said adjacent wall to a low pressure stage of the turbine in which the temperature and pressure of the working fluid are commensurate with that of the heated cooling fluid.

8. The method of operating elastic fluid turbines having a plurality of pressure stages and a means including spaced walls defining a nozzle arranged to deliver a motive fluid to a row of moving blades which comprises flowing a high temperature motive fluid through the nozzle and in contact with one of said walls, simultaneously flowing a cooling fluid in heat exchanging relation with respect to the wall which is immediately adjacent the said one wall, increasing and decreasing both the temperature and the pressure of the motive fluid as the load increases and decreases throughout the normal operating range, decreasing and increasing the initial temperature of the cooling fluid, the rate of flow and the pressure of the cooling fluid so as to maintain the temperature of said adjacent wall substantially constant and near the maximum value at which the said wall will safely withstand the pressure stresses to which it is subjected and so as to maintain a minimum and substantially constant pressure differential between the cooling and motive fluids, and delivering the cooling fluid which has passed in heat exchanging relation with respect to said nozzle to a low pressure stage of the turbine in which the temperature and pressure of the working fluid are commensurate with that of the heated cooling fluid.

9. The method of operating elastic fluid turbines having a plurality of pressure stages, means including spaced walls defining a jacketed nozzle arranged to deliver a motive fluid to a row of moving blades which comprises flowing a high temperature motive fluid through said nozzle and in contact with one of said walls, simultaneously flowing some cooling fluid through the space between the said one wall and the next adjacent wall and additional cooling fluid in heat exchanging relation with respect to the outer surface of the said next adjacent wall, increasing and decreasing the temperature and the pressure of the motive fluid as the load increases and decreases throughout the normal operating range, increasing and decreasing the pressure of the fluid flowing through said space so as to maintain a minimum and substantially constant pressure differential between the cooling fluid in the said space and the motive fluid, increasing and decreasing the rate of flow of the additional cooling fluid flowing in heat exchanging relation with respect to the said next adjacent wall so as to maintain the temperature of said next adjacent wall substantially constant and near the maximum value at which the said next adjacent wall will safely withstand the pressure stresses to which it is subjected, and delivering the said some of the cooling fluid which has passed through said space and the said additional cooling fluid which has passed in heat exchanging relation with respect to the said adjacent wall to separate low pressure stages of the turbine in which the pressure and temperature of the motive fluid are most nearly commensurate with that of the cooling fluid.

10. In combination with a power generating unit including a turbine having spaced walls defining a jacketed nozzle arranged to deliver the motive fluid confined by one of said walls to a row of moving blades, means operable to increase and decrease the temperature of the motive fluid passing through said nozzle as the load increases and decreases, and means for passing a cooling fluid in heat exchanging relation with respect to the wall immediately adjacent the said one wall, means for maintaining the temperature of the said adjacent wall substantially constant and near the maximum value at which the said adjacent wall will safely withstand the pressure stresses to which it is subjected comprising means operable to vary the rate of flow of the cooling fluid, and a temperature actuated means operatively associated with said flow varying means and with the said adjacent wall so as to increase and decrease the rate of flow of the cooling fluid as the temperature of the said adjacent wall tends to increase and decrease respectively.

11. In combination with a power generating unit including a turbine having spaced walls defining a jacketed nozzle arranged to deliver the motive fluid confined by one of said walls to a row of moving blades, means operable to increase and decrease the temperature of the motive fluid passing through said nozzle as the load increases and decreases, and means for passing a cooling fluid in heat exchanging relation with respect to the wall immediately adjacent the said one wall, means for maintaining the temperature of said adjacent wall substantially constant and near the maximum value at which the said adjacent wall will safely withstand the pressure stresses to which it is subjected comprising means operative to vary the initial temperature of the cooling fluid, and a temperature responsive device operatively associated with said initial temperature varying means and with the said adjacent wall so as to decrease and increase the initial temperature of the cooling fluid as the temperature of said adjacent wall tends to increase and decrease respectively.

12. A power generating unit comprising a turbine having spaced walls defining a jacketed nozzle arranged to deliver a motive fluid confined by one of said walls to a row of moving blades, means operable to increase and decrease the temperature and pressure of the motive fluid as the load increases and decreases throughout the normal operating range, means for passing a cooling fluid through the space between the said one wall and the next adjacent wall, means operable to vary the rate of flow of the cooling fluid through said space, a temperature actuated means operatively associated with said flow varying means and with said next adjacent wall so as to increase and decrease the rate of flow of the cooling fluid as the temperature of the said next adjacent wall tends to increase and decrease respectively, a second means operable to vary the pressure and the rate of flow of the cooling fluid passing through said space, and a differential pressure responsive device operatively associated with said second means and with the cooling and motive fluids so as to maintain a minimum and substantially constant pressure differential between the cooling and motive fluids throughout the normal operating range.

13. A power generating unit comprising a turbine having spaced walls defining a jacketed nozzle arranged to deliver a motive fluid confined by one of said walls to a row of moving blades, means operable to increase and decrease the temperature and pressure of the motive fluid as the load increases and decreases throughout the normal operating range, means for passing a cooling fluid through the space between the said one wall and the next adjacent wall, a first means operative to vary the initial temperature of the cooling fluid, a temperature responsive device operatively associated with said first means and with said next adjacent wall so as to decrease and increase the initial temperature of the cooling fluid as the temperature of the said next adjacent wall tends to increase and decrease respectively, a second means operable to vary the pressure and the rate of flow of the cooling fluid passing through said space, and a differential pressure responsive device operatively associated with said second means and with the cooling and motive fluids so as to maintain a minimum and substantially constant pressure differential between the cooling and motive fluids throughout the normal operating range.

14. A power generating unit comprising a turbine having spaced walls defining a jacketed nozzle arranged to deliver a motive fluid confined by one of said walls to a row of moving blades, means operable to increase and decrease the temperature and pressure of the motive fluid as the load increases and decreases throughout the normal operating range, means for passing some cooling fluid through the space between the said one wall and the next adjacent wall, means for passing additional cooling fluid in heat exchanging relation with respect to the said next adjacent wall, a variable first means positioned to restrict the flow of the said some of the cooling fluid, a temperature limiting device operatively associated with the said one wall and with said first means so as to increase the rate of flow of the said some of the cooling fluid only in the event the temperature of the said one wall exceeds the predetermined maximum value, a second means operable to vary the pressure and the rate of flow of the said some of the cooling fluid, a differential pressure responsive device operatively associated with said second means, with the motive fluid and with the said some of the cooling fluid so as to maintain a minimum and substantially constant pressure differential between said fluids, a third means operable to vary the flow of the said additional cooling fluid, and a temperature responsive device operatively associated with said third means and with said next adjacent wall so as to increase and decrease the rate of flow of said additional cooling fluid as the temperature of the said next adjacent wall tends to increase and decrease respectively.

15. A power generating unit comprising a multiple stage gas turbine, means including spaced walls defining a jacketed combustion chamber providing a cooling space surrounding a nozzle passage arranged to deliver the motive fluid to the first stage, means operable to vary the temperature and pressure of the motive fluid as the load increases and decreases throughout the normal operating range, a first means including a flow regulating device connecting the nozzle end of said cooling space with one of the stages of said turbine which is disposed in series flow relation with respect to said first stage, a second means including a pressure and flow regulating device operative to deliver cooling fluid under pressure to the opposite end of said cooling space, a temperature responsive device operatively associated with the outer wall of said cooling space and with the flow regulating device of said first means so as to increase and decrease the rate of flow of the cooling fluid through said space as the temperature of said wall tends to increase and decrease respectively, and a differential responsive device operatively associated with the cooling space and nozzle passage and with the pressure and flow regulating device of said second means so as to maintain a minimum and substantially constant pressure differential between the cooling and motive fluids.

16. A power generating unit comprising a multiple stage gas turbine, means including spaced walls defining a jacketed combustion chamber providing a cooling space surrounding a nozzle passage arranged to deliver the motive fluid to the first stage, means operable to vary the temperature and pressure of the motive fluid as the load increases and decreases throughout the normal operating range, a first means connecting the nozzle end of said cooling space with one of the stages of said turbine which is disposed in series flow relation with respect to said first stage, a second means including a pressure and flow regulating device operative to deliver cooling fluid under pressure to the opposite end of said cooling space, a third means operatively associated with said second means to vary the temperature of the cooling fluid delivered to said cooling space, a temperature responsive device operatively associated with the outer wall of said cooling space and with said third means so as to decrease and increase the temperature of the cooling fluid delivered to said cooling space as the temperature of said outer wall tends to increase and decrease respectively, and a differential pressure responsive device operatively associated with said cooling space and nozzle passage and with the pressure and flow regulating device of said second means so as to maintain a minimum and substantially constant pressure differential between said cooling and motive fluids.

17. A power generating unit comprising a multiple stage gas turbine, means including spaced walls defining a jacketed combustion chamber providing adjacent inner and outer cooling spaces surrounding a nozzle passage arranged to deliver the motive fluid to the first stage, means operable to vary the temperature and pressure of the motive fluid as the load increases and decreases throughout the normal operating range, a first means including a flow regulating device connecting the nozzle end of said inner cooling space with one of the stages of said turbine which is disposed in series flow relation with respect to said first stage, a second means including a pressure and flow regulating device operative to deliver cooling fluid under pressure to the opposite end of said inner cooling space, a third means connecting the nozzle end of said outer cooling space with another stage of the turbine which is also disposed in series flow relation with respect to said first stage, a fourth means including a flow regulating device operative to deliver cooling fluid under pressure to said outer cooling space, a temperature responsive device operatively associated with the inner wall of said inner cooling space and with the flow regulating device of said first means so as to increase the rate of flow of the cooling fluid through said inner space only in the event the temperature of the inner wall exceeds a predetermined maximum value, a differential pressure responsive device operatively associated with the inner cooling space and nozzle passage and with the pressure and flow regulating device of said second means so as to maintain a minimum and substantially constant pressure differential between the cooling fluid in said inner space and the motive fluid, and a second temperature responsive device operatively associated with the wall separating said inner and outer cooling spaces and with said fourth means so as to increase and decrease the rate of flow of the cooling fluid through said outer space as the temperature of said separating wall tends to increase and decrease respectively.

18. The method of operating elastic fluid turbines having means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the said one wall and with respect to the wall which is immediately adjacent the said one wall, varying the temperature and the pressure of the motive fluid in accordance with changes in load, and varying the pressure and the temperature reducing effectiveness of the cooling fluid so as to maintain the temperature of said adjacent wall substantially constant and near the maximum value at which the said adjacent wall will safely withstand the pressure stresses to which it is subjected and so as to maintain a minimum and substantially constant pressure differential between the cooling and motive fluids.

19. The method of operating elastic fluid turbines having means including spaced walls defining a jacketed nozzle arranged to deliver a motive fluid to a row of moving blades which comprises flowing a high temperature motive fluid through the nozzle and in contact with one of said walls, simultaneously flowing a cooling fluid in heat exchanging relation with respect to the said one wall and with respect to the wall which is immediately adjacent the said one wall, varying the temperature and the pressure of the motive fluid in accordance with changes in load, varying the pressure and the temperature reducing effectiveness of the cooling fluid so as to maintain the temperature of said adjacent wall substantially constant and near the maximum value at which the said adjacent wall will safely withstand the pressure stresses to which it is subjected and so as to maintain a minimum and substantially constant pressure differential between the cooling and motive fluids, and delivering the cooling fluid which has passed in heat exchanging relation with respect to the said adjacent wall to a low pressure stage of the turbine in which the temperature and pressure of the motive fluid are nearly commensurate with that of the heated cooling fluid.

20. In combination with a power generating unit including a turbine having spaced walls defining a jacketed nozzle arranged to deliver a motive fluid confined by one of said walls to a row of moving blades, means operable to vary the temperature of the motive fluid passing through said nozzle in accordance with changes in load, and means for passing cooling fluid in heat exchanging relation with respect to the wall immediately adjacent the said one wall, means for maintaining the temperature of said adjacent wall substantially constant and near the maximum value at which the said adjacent wall will safely withstand the pressure stresses to which it is subjected comprising means operative to vary the temperature reducing effectiveness of the cooling fluid, and a temperature responsive device operatively associated with said means for varying the temperature reducing effectiveness of the cooling fluid and with said adjacent wall so as to increase and decrease the temperature reducing effectiveness of the cooling fluid as the temperature of said adjacent wall increases and decreases respectively.

21. A power generating unit comprising a turbine having spaced walls defining a jacketed nozzle arranged to deliver a motive fluid confined by one of said walls to a row of moving blades, means operable to vary the temperature and pressure of the motive fluid in accordance with changes in load, means for passing cooling fluid in heat exchanging relation with respect to said one wall and with respect to the next adjacent wall, a first means operable to vary the temperature reducing effectiveness of the cooling fluid, a temperature actuated means operatively associated with said means for varying the temperature reducing effectiveness of the cooling fluid and with said next adjacent wall so as to increase and decrease the temperature reducing effectiveness of the cooling fluid as the temperature of the said next adjacent wall increases and decreases, respectively, a second means operable to vary the pressure and the rate of flow of the cooling fluid, and a differential pressure responsive device operatively associated with said second means and with the cooling and motive fluids so as to maintain a minimum and substantially constant pressure differential between the cooling and motive fluids throughout the normal operating range.

22. In a combination comprising a compressor, a multi-stage gas turbine drivingly connected with said compressor, and a combustion chamber and nozzle structure forming a high temperature motive fluid generating passage connecting the discharge end of said compressor with the first stage of said turbine, means forming with a high temperature motive fluid confining wall portion of said structure a surrounding cooling fluid passage for conducting a portion of the air discharged from said compressor in direct heat exchanging relation with said high temperature motive confining wall portion and then into a stage of said turbine which is disposed in series flow relation with respect to said first stage and in which the temperature and the pressure of the motive fluid are commensurate with the temperature and the pressure of the entering air.

23. The method of operating a power plant including a compressor, a multistage gas turbine drivingly connected with said compressor, and a combustion chamber and nozzle structure forming a passage connecting the discharge end of said compressor with the first stage of said turbine which comprises forming with the compressed air entering the combustion chamber portion of said passage a high temperature motive fluid which flows through the nozzle portion of said passage and into the first stage of said turbine, and conducting a portion of the air discharged from said compressor in direct heat exchanging relation with a high temperature motive fluid confining wall portion of said structure and then into a stage of said turbine which is disposed in series flow relation with respect to said first stage and in which the temperature and the pressure of the motive fluid are commensurate with the temperature and the pressure of the entering air.

24. The method of operating elastic fluid turbines having means including spaced walls defining a jacketed structure arranged to deliver a motive fluid to a row of moving blades which comprises flowing a high temperature motive fluid through the structure and in contact with one of said walls, simultaneously flowing a cooling fluid in heat exchanging relation with respect to said one wall and with respect to the wall which is immediately adjacent the said one wall, varying the energy content of the motive fluid in accordance with changes in load, and varying the rate of flow of the cooling fluid so as to maintain the temperature of said adjacent wall substantially constant and near the maximum value at which the said adjacent wall will safely withstand the pressure stresses to which it is subjected and so as to maintain a minimum and substantially constant pressure differential between the cooling and motive fluids.

JAMES L. RAY.